US008926138B2

(12) United States Patent
Reed et al.

(10) Patent No.: US 8,926,138 B2
(45) Date of Patent: Jan. 6, 2015

(54) GAS-DISCHARGE LAMP REPLACEMENT

(75) Inventors: William G. Reed, Seattle, WA (US);
John O. Renn, Lake Forest Park, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 664 days.

(21) Appl. No.: 12/437,467

(22) Filed: May 7, 2009

(65) Prior Publication Data

US 2009/0284155 A1      Nov. 19, 2009

Related U.S. Application Data

(60) Provisional application No. 61/052,924, filed on May 13, 2008.

(51) Int. Cl.
| F21V 29/00 | (2006.01) |
| H05B 33/08 | (2006.01) |
| F21V 23/04 | (2006.01) |
| H05B 37/02 | (2006.01) |
| F21K 99/00 | (2010.01) |
| F21Y 101/02 | (2006.01) |
| F21V 23/00 | (2006.01) |
| F21S 8/00 | (2006.01) |

(52) U.S. Cl.
CPC ........ *H05B 33/0803* (2013.01); *F21V 23/0442* (2013.01); *H05B 37/0218* (2013.01); *F21V 23/0457* (2013.01); *F21K 9/13* (2013.01); *F21Y 2101/02* (2013.01); *Y02B 20/383* (2013.01); *Y02B 20/46* (2013.01); *F21V 29/2231* (2013.01); *F21V 23/006* (2013.01); *F21V 23/045* (2013.01); *F21S 8/036* (2013.01)
USPC ............... 362/294; 362/249.019; 362/249.02; 362/373; 315/309

(58) Field of Classification Search
USPC ......... 362/218, 227, 230, 231, 235, 240, 244, 362/249.01, 249.02, 249.11, 264, 294, 345, 362/373, 545, 547, 650, 800, 802; 315/291, 315/307, 309
See application file for complete search history.

(56) References Cited

U.S. PATENT DOCUMENTS

| 4,153,927 A | 5/1979 | Owens |
| 4,237,377 A | 12/1980 | Sansum |

(Continued)

FOREIGN PATENT DOCUMENTS

| DE | 4001980 | 8/1990 |
| DE | 189 10 827 A1 | 9/1999 |

(Continued)

OTHER PUBLICATIONS

Renn et al., "Solid State Lighting Device and Method Employing Heat Exchanger Thermally Coupled Circuit Board," U.S. Appl. No. 61/357,421, filed Jun. 22, 2010, 49 pages.

(Continued)

*Primary Examiner* — Hargobind S Sawhney
(74) *Attorney, Agent, or Firm* — Seed IP Law Group PLLC

(57) ABSTRACT

An illumination device comprising a housing fixture, a light source, and an active heat transfer device is provided. The housing fixture includes a base adapted to be receivable in a light fixture receptacle configured to receive a gas-discharge lamp. The light source emits light with a color rendering index higher than a respective color rendering index of at least a type of gas-discharge lamp. The active heat transfer device is physically coupled to the light source and mounted to the housing fixture. The active heat transfer device receives power from a power supply to remove thermal energy from the light source.

22 Claims, 10 Drawing Sheets

(56) References Cited

U.S. PATENT DOCUMENTS

| | | | |
|---|---|---|---|
| 5,086,379 A | 2/1992 | Denison et al. | |
| 5,150,009 A * | 9/1992 | Kling et al. | 315/107 |
| 5,160,202 A | 11/1992 | Légaré | 362/153.1 |
| 5,230,556 A | 7/1993 | Canty et al. | |
| 5,274,350 A | 12/1993 | Larson | |
| 5,343,121 A | 8/1994 | Terman et al. | |
| 5,349,505 A | 9/1994 | Poppenheimer | |
| 5,450,302 A | 9/1995 | Maase et al. | |
| 5,589,741 A | 12/1996 | Terman et al. | |
| 5,948,829 A | 9/1999 | Wallajapet et al. | |
| 6,094,919 A * | 8/2000 | Bhatia | 62/3.7 |
| 6,111,739 A | 8/2000 | Wu et al. | |
| 6,149,283 A | 11/2000 | Conway et al. | |
| 6,230,497 B1 * | 5/2001 | Morris et al. | 62/3.7 |
| 6,400,101 B1 * | 6/2002 | Biebl et al. | 315/291 |
| 6,499,860 B2 * | 12/2002 | Begemann | 362/230 |
| 6,601,972 B2 * | 8/2003 | Sei et al. | 362/236 |
| 6,612,720 B1 | 9/2003 | Beadle | |
| 6,753,842 B1 | 6/2004 | Williams et al. | |
| 6,787,999 B2 | 9/2004 | Stimac et al. | |
| 6,847,156 B2 | 1/2005 | Kim | |
| 6,885,134 B2 * | 4/2005 | Kurashima et al. | 313/46 |
| 6,948,829 B2 * | 9/2005 | Verdes et al. | 362/227 |
| 6,964,501 B2 * | 11/2005 | Ryan | 362/294 |
| 7,122,976 B1 | 10/2006 | Null et al. | |
| 7,144,140 B2 * | 12/2006 | Sun et al. | 362/373 |
| 7,145,179 B2 * | 12/2006 | Petroski | 257/81 |
| 7,165,866 B2 * | 1/2007 | Li | 362/294 |
| 7,213,940 B1 * | 5/2007 | Van De Ven et al. | 362/231 |
| 7,239,087 B2 | 7/2007 | Ball | 315/128 |
| 7,252,385 B2 * | 8/2007 | Engle et al. | 353/52 |
| 7,314,261 B2 * | 1/2008 | Jackson Pulver et al. | 347/9 |
| 7,317,403 B2 | 1/2008 | Grootes et al. | 340/815.45 |
| 7,330,002 B2 * | 2/2008 | Joung | 315/309 |
| 7,339,323 B2 | 3/2008 | Bucur | 315/128 |
| 7,339,471 B1 | 3/2008 | Chan et al. | |
| 7,341,362 B2 * | 3/2008 | Bjornson et al. | 362/294 |
| 7,387,403 B2 * | 6/2008 | Mighetto | 362/218 |
| 7,438,440 B2 * | 10/2008 | Dorogi | 362/294 |
| 7,458,330 B2 * | 12/2008 | MacDonald et al. | 114/177 |
| 7,461,964 B1 | 12/2008 | Aubrey | |
| 7,475,002 B1 * | 1/2009 | Mann | 703/23 |
| 7,524,089 B2 * | 4/2009 | Park | 362/294 |
| 7,549,773 B2 | 6/2009 | Lim | |
| 7,556,406 B2 * | 7/2009 | Petroski et al. | 362/294 |
| 7,559,674 B2 | 7/2009 | He et al. | |
| 7,595,595 B2 * | 9/2009 | Mehta | 315/291 |
| 7,626,342 B2 * | 12/2009 | Sun et al. | 315/247 |
| 7,635,203 B2 * | 12/2009 | Weaver et al. | 362/260 |
| 7,637,633 B2 * | 12/2009 | Wong | 362/294 |
| 7,695,160 B2 * | 4/2010 | Hirata et al. | 362/264 |
| 7,766,507 B2 | 8/2010 | Nakajima | |
| 7,874,699 B2 | 1/2011 | Liang | |
| 7,874,710 B2 * | 1/2011 | Tsai et al. | 362/373 |
| 7,901,107 B2 * | 3/2011 | Van De Ven et al. | 362/231 |
| 8,186,855 B2 | 5/2012 | Wassel et al. | |
| 8,254,137 B2 | 8/2012 | Wilkolaski et al. | |
| 8,324,641 B2 * | 12/2012 | Yan et al. | 257/98 |
| 2001/0014019 A1 | 8/2001 | Begemann | |
| 2003/0123521 A1 * | 7/2003 | Luoma | 374/183 |
| 2004/0095772 A1 | 5/2004 | Hoover et al. | 362/363 |
| 2004/0105264 A1 | 6/2004 | Spero | |
| 2004/0120148 A1 | 6/2004 | Morris | |
| 2004/0120156 A1 | 6/2004 | Ryan | |
| 2004/0201992 A1 | 10/2004 | Dalton et al. | |
| 2005/0057187 A1 | 3/2005 | Catalano | |
| 2005/0099802 A1 | 5/2005 | Lai | |
| 2005/0135101 A1 | 6/2005 | Richmond | 362/276 |
| 2005/0146884 A1 | 7/2005 | Scheithauer | |
| 2005/0174780 A1 | 8/2005 | Park | |
| 2005/0243022 A1 | 11/2005 | Negru | 345/46 |
| 2005/0254013 A1 | 11/2005 | Engle et al. | |
| 2005/0265019 A1 | 12/2005 | Sommers et al. | |
| 2006/0001384 A1 | 1/2006 | Tain et al. | |
| 2006/0014118 A1 | 1/2006 | Utama | |
| 2006/0034075 A1 | 2/2006 | Alessio | |
| 2006/0056172 A1 | 3/2006 | Fiene | 362/147 |
| 2006/0098440 A1 | 5/2006 | Allen | 362/294 |
| 2006/0158130 A1 | 7/2006 | Furukawa | 315/200 R |
| 2006/0202914 A1 | 9/2006 | Ashdown | |
| 2006/0262544 A1 | 11/2006 | Piepgras et al. | |
| 2006/0277823 A1 | 12/2006 | Barnett et al. | 47/33 |
| 2007/0096118 A1 | 5/2007 | Mahalingam et al. | |
| 2007/0102033 A1 | 5/2007 | Petrocy | |
| 2007/0139961 A1 | 6/2007 | Cheah et al. | |
| 2007/0147046 A1 | 6/2007 | Arik et al. | |
| 2007/0159819 A1 | 7/2007 | Bayat et al. | |
| 2007/0183156 A1 | 8/2007 | Shan | |
| 2007/0230183 A1 | 10/2007 | Shuy | 362/294 |
| 2007/0247853 A1 | 10/2007 | Dorogi | 362/294 |
| 2007/0279921 A1 | 12/2007 | Alexander et al. | 362/368 |
| 2007/0285920 A1 | 12/2007 | Seabrook | 362/240 |
| 2007/0297184 A1 | 12/2007 | Isely | |
| 2008/0106907 A1 | 5/2008 | Trott et al. | |
| 2008/0130304 A1 | 6/2008 | Rash et al. | |
| 2008/0232119 A1 | 9/2008 | Ribarich | 362/373 |
| 2008/0253125 A1 | 10/2008 | Kang et al. | 362/294 |
| 2008/0266839 A1 | 10/2008 | Claypool et al. | |
| 2008/0271065 A1 | 10/2008 | Buonasera et al. | |
| 2008/0291661 A1 | 11/2008 | Martin | |
| 2008/0298058 A1 | 12/2008 | Kan et al. | |
| 2008/0309240 A1 | 12/2008 | Goray et al. | 315/56 |
| 2009/0001372 A1 * | 1/2009 | Arik et al. | 257/58 |
| 2009/0109625 A1 | 4/2009 | Booth et al. | |
| 2009/0161356 A1 | 6/2009 | Negley et al. | |
| 2009/0225540 A1 | 9/2009 | Chen | |
| 2009/0244899 A1 | 10/2009 | Chyn | |
| 2009/0278474 A1 | 11/2009 | Reed et al. | 315/294 |
| 2009/0278479 A1 | 11/2009 | Platner et al. | |
| 2010/0008090 A1 | 1/2010 | Li et al. | |
| 2010/0053962 A1 | 3/2010 | Mo et al. | |
| 2010/0060130 A1 | 3/2010 | Li | 313/46 |
| 2010/0084979 A1 | 4/2010 | Burton et al. | |
| 2010/0090577 A1 | 4/2010 | Reed et al. | 313/46 |
| 2010/0123403 A1 | 5/2010 | Reed | 315/193 |
| 2010/0177519 A1 | 7/2010 | Schlitz | |
| 2010/0277082 A1 | 11/2010 | Reed et al. | 315/159 |
| 2010/0277914 A1 | 11/2010 | Bachl et al. | |
| 2010/0277917 A1 | 11/2010 | Shan | |
| 2010/0290236 A1 | 11/2010 | Gingrich, III et al. | |
| 2010/0295454 A1 | 11/2010 | Reed | |
| 2010/0295455 A1 | 11/2010 | Reed | |
| 2010/0295946 A1 | 11/2010 | Reed et al. | 348/164 |
| 2010/0328947 A1 | 12/2010 | Chang et al. | |
| 2011/0001626 A1 | 1/2011 | Yip et al. | |
| 2011/0175518 A1 | 7/2011 | Reed et al. | |
| 2011/0310605 A1 | 12/2011 | Renn et al. | |

FOREIGN PATENT DOCUMENTS

| | | | | |
|---|---|---|---|---|
| DE | 19810827 A1 * | 9/1999 | | G09G 3/14 |
| EP | 1 734 795 A1 | 12/2006 | | |
| FR | 2883306 | 9/2006 | | |
| JP | 2001-333420 A | 11/2001 | | |
| JP | 2004-349065 A | 12/2004 | | |
| JP | 2006-31977 A | 2/2006 | | |
| JP | 2006031977 A * | 2/2006 | | |
| JP | 2006-244711 A | 9/2006 | | |
| KR | 10-2008-0094344 A | 10/2008 | | |
| WO | 02/076068 A1 | 9/2002 | | |
| WO | 03/056882 A1 | 7/2003 | | |
| WO | 2006/057866 | 6/2006 | | |
| WO | 2007/036873 A2 | 4/2007 | | |
| WO | 2008/030450 | 3/2008 | | |
| WO | 2009/040703 A2 | 4/2009 | | |

OTHER PUBLICATIONS

International Search Report, mailed Jul. 9, 2009 for PCT/US2009/043171, 3 pages.
Written Opinion, mailed Jul. 9, 2009 for PCT/US2009/043171, 8 pages.
International Search Report, mailed Jun. 21, 2010 for PCT/US2009/064625, 3 pages.

(56) References Cited

OTHER PUBLICATIONS

Written Opinion, mailed Jun. 21, 2010 for PCT/US2009/064625, 5 pages.
International Search Report, mailed Jun. 10, 2009 for PCT/US2009/043170, 4 pages.
Written Opinion, mailed Jun. 10, 2009 for PCT/US2009/043170, 7 pages.
Reed et al., "Turbulent Flow Cooling for Electronic Ballast," Office Action mailed Dec. 29, 2010 for U.S. Appl. No. 12/540,250, 16 pages.
"A Review of the Literature on Light Flicker: Ergonomics, Biological Attributes, Potential Health Effects, and Methods in Which Some LED Lighting May Introduce Flicker," IEEE Standard P1789, Feb. 26, 2010, 26 pages.
International Search Report, mailed Sep. 29, 2011 for PCT/US2011/041402, 3 pages.
Reed et al., "Turbulent Flow Cooling for Electronic Ballast," Amendment filed Oct. 14, 2011 for U.S. Appl. No. 12/540,250, 12 pages.
Written Opinion, mailed Sep. 29, 2011 for PCT/US2011/041402, 4 pages.
International Search Report, mailed Nov. 29, 2010 for PCT/US2010/033000, 3 pages.
Written Opinion, mailed Nov. 29, 2010 for PCT/US2010/033000, 5 pages.
Reed et al., "Turbulent Flow Cooling for Electronic Ballast," Amendment filed Apr. 29, 2011 for U.S. Appl. No. 12/540,250, 11 pages.
Reed et al., "Turbulent Flow Cooling for Electronic Ballast," Office Action mailed Jul. 20, 2011 for U.S. Appl. No. 12/540,250, 15 pages.
Reed, "Apparatus and Method of Energy Efficient Illumination," U.S. Appl. No. 61/333,983, filed May 12, 2010.
Reed, "Apparatus and Method of Energy Efficient Illumination," U.S. Appl. No. 61/346,263, filed May 19, 2010.
Reed et al., "Electrically Isolated Heat Sink for Solid-State Light," U.S. Appl. No. 12/846,516, filed Jul. 29, 2010.
Reed et al., "Turbulent Flow Cooling for Electronic Ballast," Office Action mailed Jan. 5, 2012 for U.S. Appl. No. 12/540,250, 12 pages.
International Search Report, mailed Dec. 13, 2010 for PCTAN PCT/US2010/035649, 3 Pages.
Written Opinion of the International Searching Authority, mailed Dec. 13, 2010 for PCTAN PCT/US2010/035649, 4 Pages.
Reed et al., "Gas-Discharge Lamp Replacement With Passive Cooling," Office Action mailed Jul. 31, 2012 for U.S. Appl. No. 12/769,956, 15 pages.
Reed et al., "Apparatus, Method to Change Light Source Color Temperature With Reduced Optical Filtering Losses," U.S. Appl. No. 61/295,519, filed Jan. 15, 2010, 35 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Oct. 8, 2012 for PCT/US2012/033059, 3 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Oct. 8, 2012 for PCT/US2012/033059, 3 pages.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Littelfuse, "Application Note: Protecting LEDs in Product Designs," 2009, 2 pages.
Panasonic Electronic Components, "LED Lighting Solutions," 2009, 6 pages.
Renesas Electronics, "Zener Diodes for Surge Absorption—Applications of high-intensity LED," Apr. 2010, 1 page.
Tyco Electronics, "Circuit Protection," retrieved Jun. 10, 2011, retrieved from http://www.tycoelectronics.com/en/products/circuit-protection.html, 2 pages.
Reed et al., "Apparatus and Method for Schedule Based Operation of a Luminaire" U.S. Appl. No. 13/604,327, filed Sep. 5, 2012, 44 pages.
Reed, "Apparatus and Method of Energy Efficient Illumination Using Received Signals ," U.S. Appl. No. 13/085,301, filed Apr. 12, 2011, 99 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature with Reduced Optical Filtering Losses," U.S. Appl. No. 61/406,490, filed Oct. 25, 2010, 46 pages.
Reed et al., "Apparatus, Method to Change Light Source Color Temperature With Reduced Optical Filtering Losses," U.S. Appl. No. 13/007,080, filed Jan. 14, 2011, 45 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electronic Control to Regulate Power for Solid-State Lighting and Methods Thereof," U.S. Appl. No. 12/619,535, filed Nov. 16, 2009, 62 pages.
Reed, "Electrostatic Discharge Protection for Luminaire," U.S. Appl. No. 13/212,074, filed Aug. 17, 2011, 30 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed, "Resonant Network for Reduction of Flicker Perception in Solid State Lighting Systems," U.S. Appl. No. 61/527,029, filed Aug. 24, 2011, 41 pages.
Reed et al., "Systems and Methods That Employ Object Recognition," U.S. Appl. No. 13/411,321, filed Mar. 2, 2012, 51 pages.
Reed et al., "Electrically Isolated Heat Sink for Solid-State Light," Office Action mailed Apr. 4, 2013 for U.S. Appl. No. 12/846,516, 12 pages.
Reed et al., "Electrically Isolated Heat Sink for Solid-State Light," Office Action mailed Oct. 12, 2012 for U.S. Appl. No. 12/846,516, 11 pages.
Reed et al., "Electrically Isolated Heat Sink for Solid-State Light," Response filed Jan. 14, 2013, for U.S. Appl. No. 12/846,516, 16 pages.
Reed et al., "Gas-Discharge Lamp Replacement With Passive Cooling," Amendment filed Oct. 30, 2012 for U.S. Appl. No. 12/769,956, 12 pages.
Reed et al., "Gas-Discharge Lamp Replacement With Passive Cooling," Office Action mailed Nov. 26, 2012 for U.S. Appl. No. 12/769,956, 18 pages.
Reed et al., "Gas-Discharge Lamp Replacement With Passive Cooling," Amendment filed Mar. 25, 2013 for U.S. Appl. No. 12/769,956, 13 pages.
Reed et al., "Gas-Discharge Lamp Replacement With Passive Cooling," Office Action mailed Apr. 26, 2013 for U.S. Appl. No. 12/769,956, 20 pages.
Reed et al., "Gas-Discharge Lamp Replacement With Passive Cooling," Amendment filed Jul. 25, 2013 for U.S. Appl. No. 12/769,956, 12 pages.
Reed et al., "Gas-Discharge Lamp Replacement With Passive Cooling," Office Action mailed Aug. 28, 2013 for U.S. Appl. No. 12/769,956, 22 pages.
Reed et al., "Turbulent Flow Cooling for Electronic Ballast," Notice of Allowance mailed Aug. 15, 2012, for U.S. Appl. No. 12/540,250, 7 pages.
Reed et al., "Turbulent Flow Cooling for Electronic Ballast," Response filed Apr. 5, 2012 for U.S. Appl. No. 12/540,250, 8 pages.
Renn et al., "Solid State Lighting Device and Method Employing Heat Exchanger Thermally Coupled Circuit Board," Office Action mailed Apr. 29, 2013 for U.S. Appl. No. 13/166,626, 19 pages.

(56) References Cited

OTHER PUBLICATIONS

Renn et al., "Solid State Lighting Device and Method Employing Heat Exchanger Thermally Coupled Circuit Board," Amendment filed Sep. 24, 2013 for U.S. Appl. No. 13/166,626, 19 pages.
Reed et al., "Gas-Discharge Lamp Replacement With Passive Cooling," Amendment filed Apr. 11, 2014, for U.S. Appl. No. 12/769,956, 16 pages.
Reed et al., "Gas-Discharge Lamp Replacement With Passive Cooling," Office Action mailed May 9, 2014, for U.S. Appl. No. 12/769,956, 22 pages.
Renn et al., "Solid State Lighting Device and Method Employing Heat Exchanger Thermally Coupled Circuit Board," Amendment filed Mar. 11, 2014, for U.S. Appl. No. 13/166,626, 24 pages.
Reed et al., "Gas-Discharge Lamp Replacement With Passive Cooling," Amendment filed Nov. 27, 2013, for U.S. Appl. No. 12/769,956, 19 pages.
Reed et al., "Gas-Discharge Lamp Replacement With Passive Cooling," Office Action mailed Dec. 23, 2013, for U.S. Appl. No. 12/769,956, 18 pages.
Renn et al., "Solid State Lighting Device and Method Employing Heat Exchanger Thermally Coupled Circuit Board," Office Action mailed Jan. 14, 2014, for U.S. Appl. No. 13/166,626, 19 pages.
U.S. Appl. No. 12/437,472, Reed et al., filed May 7, 2009.
U.S. Appl. No. 12/540,250, Reed et al., filed Aug. 12, 2009.
U.S. Appl. No. 61/051,619, Reed et al., filed May 8, 2008.
U.S. Appl. No. 61/052,924, Reed et al., filed May 13, 2008.
U.S. Appl. No. 61/088,651, Reed et al., filed Aug. 13, 2008.
U.S. Appl. No. 61/115,438, Reed, filed Nov. 17, 2008.
U.S. Appl. No. 61/154,619, Reed, filed Feb. 23, 2009.
U.S. Appl. No. 61/174,913, Reed et al., filed May 1, 2009.
U.S. Appl. No. 61/180,017, Reed et al., filed May 20, 2009.
U.S. Appl. No. 61/229,435, Reed et al., filed Jul. 29, 2009.

* cited by examiner

GAS-DISCHARGE LAMP REPLACEMENT

CROSS-REFERENCE TO RELATED APPLICATION

This application claims the benefit under 35 U.S.C. §119(e) of U.S. Provisional Patent Application Ser. No. 61/052,924, filed May 13, 2008, entitled "Gas-Discharge Lamp Replacement", which is incorporated herein by reference in its entirety.

BACKGROUND

1. Technical Field

This disclosure generally relates to an illumination device and more particularly to an illumination device to retrofit light fixtures as a replacement of gas-discharge lamps.

2. Description of the Related Art

Gas-discharge lamps are a family of artificial light sources that generate light by sending an electrical discharge through an ionized gas. Mercury-vapor lamps, a type of gas-discharge lamp commonly referred to as "security lights," use mercury in an excited state to produce light. The manufacture and importation of mercury-vapor ballasts and luminaires, however, are banned by the Energy Conservation Act of 2005. As a result, no new ballasts for mercury-vapor type luminaires are permitted to be manufactured or imported. Consequently, installation of these luminaires is limited to the quantity of ballasts still existing in the inventory of manufacturers, distributors, and retail sales stores. Nevertheless, mercury-vapor bulbs can still be manufactured and imported in order to support the existing installed bases of luminaires of this type.

One reason for banning the manufacturing and importation of mercury-vapor lamp ballasts was that the combination of mercury-vapor ballasts and mercury-vapor bulbs results in energy inefficiency as well as a very low power factor. Power factor in an alternating-current (AC) electrical system is defined as the ratio of the "true power" to the "apparent power", and is a number between 0 and 1. True power is the power dissipated by the luminaire. Apparent power is the total power that must be supplied to the luminaire including the power stored and returned to the power grid due to reactive components in the luminaire. Mercury-vapor lamps typically have a low power factor of about 0.35 pf.

In addition to the energy concerns, the fact that mercury-vapor lamps emit light with a low color rendering index (CRI) is another concern. For reference, sunlight has a CRI of 100 and represents "ideal light" in that it contains a continuous spectrum of visible radiation making all colors of an illuminated surface perceptible to the human eye. Light with a low CRI is less useful because illuminated surfaces are not all perceived as their true color. Light with a low CRI is also less pleasing to the eye, and less useful for discrimination of an illuminated scene. Mercury-vapor lamps have, on average, a very low CRI of approximately 35.

Another concern with mercury-vapor lamps is the long warm-up time required to achieve full output. The long startup time prohibits the effective use of motion-detecting sensors to turn mercury-vapor luminaires on automatically when people, animals or other objects are present. For this reason, mercury-vapor luminaires are typically turned on with an ambient light sensor that senses the low level of light after sunset, and then left on all night. This is a very wasteful protocol which consumes large amounts of energy when no light is needed.

During the warm-up time a mercury-vapor lamp typically has much higher energy consumption than during normal operation. As much as 10 times the usual amount of current for normal operation is required during warm-up. This can cause expensive overdesign of the electrical wiring, especially when multiple mercury-vapor lamps may turn on at the same time. For example, a load comprised of ten 175-watt luminaires might consume 17,000 watts within the warm-up times of the lamps when turned on.

Moreover, typical mercury-vapor luminaires have an optical design which results in as much as 40% of the emitted light escaping upward. This light, and the energy consumed to produce it, is wasted because the escaping light is not directed toward the areas the luminaires are intended to illuminate. The upward escaping light is a source of "light trespass" in that it illuminates other areas where the illumination is not desired. It pollutes the sky, causing problems for astronomers and others who wish to view the night sky.

Furthermore, mercury is a very toxic metal that contaminates landfills and water supplies when not disposed of properly, or when a mercury-vapor lamp is accidentally broken. Mercury is restricted and controlled by statute in most developed countries. Consequently, mercury-vapor lamps are expensive and troublesome to dispose of at end of life.

Other types of gas-discharge lamps, including high-pressure sodium-vapor lamps and metal halide lamps, have been developed to address some of the aforementioned problems. High-pressure sodium-vapor lamps are somewhat more energy efficient than mercury-vapor lamps, but still suffer from poor CRI and they also contain mercury. Metal halide lamps are not commonly available to work with mercury-vapor lamp ballasts, and typically require a higher ignition voltage to start. Both high-pressure sodium-vapor lamps and metal halide lamps have similar warm-up and cool-down characteristics as mercury-vapor lamps. Neither corrects for the poor optical design of the security light luminaires. Both alternative types of lamps have a poor power factor when used with mercury-vapor lamp ballasts. Thus, none of these alternative gas-discharge lamps can serve as an ideal replacement of mercury-vapor lamps to fully address the aforementioned problems associated with mercury-vapor lamps.

There is, therefore, a need for a mercury-vapor lamp replacement that has a higher CRI and better power factor, consumes less power, turns on and off faster, and contains no mercury.

BRIEF SUMMARY

An illumination device may be summarized as including a housing fixture including a base adapted to be receivable in a light fixture receptacle configured to receive a gas-discharge lamp; a light source configured to emit light with a color rendering index higher than a respective color rendering index of at least a type of gas-discharge lamp; and an active heat transfer device physically coupled to the light source and mounted to the housing fixture, the active heat transfer device configured to receive power from a power supply to remove thermal energy from the light source. The active heat transfer device may include a passive heat sink physically coupled to the light source to absorb at least a portion of the heat generated by the light source; and an active cooler adapted to cause movement of a fluid along a surface of the passive heat sink when powered.

The illumination device may further include a temperature measuring device coupled to measure a temperature representative of a temperature of the light source, the temperature measuring device configured to adjust a current flowing through the light source responsive to the measured temperature. The temperature measuring device may include a thermistor having a negative temperature coefficient.

The illumination device may further include a substantially transparent cover mounted on the heat transfer device to enclose the light source between the substantially transparent cover and the active heat transfer device.

The illumination device may further include a substantially transparent substance applied between and in contact with the light source and the substantially transparent cover to provide index matching between the light source and the substantially transparent cover to reduce reflective losses in light emitted by the light source. The substantially transparent substance may include a silicone gel.

The illumination device may further include an activation device coupled between the light source and the power supply, the activation device configured to allow power to be provided to the light source in a first condition, the activation device further configured to prevent power from being provided to the light source in a second condition. The activation device may include a photo-detecting device configured to detect whether or not an intensity of ambient light is above a threshold. The activation device may include a signal receiver configured to receive a control signal from a signal transmitter. The signal receiver and the signal transmitter may be configured to communicate in signals compliant with at least one of ZigBee protocols and X10 protocols. The activation device may be configured to receive the control signal from a motion detector.

The illumination device may further include a mesh mounted in a way to prevent at least some foreign objects from entering the active heat transfer device. The light source may include at least one solid-state light emitting device. The light source may include at least one light-emitting diode.

The illumination device may further include a power control device coupled to the light source, the power control device configured to receive power to provide regulated current to the light source. The housing fixture may include fin-shaped structures around a peripheral surface of the housing fixture.

An illumination device for retrofitting a gas-discharge lamp light fixture may be summarized as including a solid-state light emitter; an active heat transfer device to which the solid-state light emitter is mounted, the heat transfer device configured to remove thermal energy from the solid-state light emitter at a first rate when not powered and at a second rate higher than the first rate when powered; and a temperature measuring device coupled to measure a temperature representative of a temperature of the solid-state light emitter to adjust a current flowing through the solid-state light emitter responsive to the measured temperature. The heat transfer device may include a passive heat sink physically coupled to the solid-state light emitter; and a synthetic jet air mover configured to receive power from the power supply to cause air to move towards and around the passive heat sink.

The illumination device may further include a power control device coupled to the solid-state light emitter, the power control device configured to receive power from a power supply to provide regulated current to the solid-state light emitter.

The illumination device may further include a cover mounted on the heat transfer device to enclose the solid-state light emitter between the cover and the heat transfer device, the cover being substantially transparent; and a substantially transparent substance applied between and in contact with the solid-state light emitter and the cover to provide index matching between the solid-state light emitter and the cover to reduce reflective losses in light emitted by the solid-state light emitter.

The illumination device may further include an activation device coupled to control an electrical connection between a power supply and the solid-state light emitter to activate and deactivate the solid-state light emitter. The activation device may control the electrical connection between a power supply and the solid-state light emitter based on an input from at least one of a photo detector, a ZigBee-compliant device, a X10-compliant device, and a motion detector. The activation device may be configured to receive the input by at least one of wireless transmission and wired transmission. The solid-state light emitter may include at least one light-emitting diode.

The illumination device may further include a housing fixture adapted to fit in the gas-discharge lamp light fixture, the housing fixture having an opening in a first end to which the active heat transfer device is mounted, the housing fixture further having a threaded base in a second end opposite the first end for insertion into a threaded socket of the light fixture to connect to a power supply. The housing fixture may include fin-shaped structures around a peripheral surface of the housing fixture.

The illumination device may further include a based sized and dimensioned to be received in a light fixture receptacle configured to receive a gas-discharge lamp.

Figure 1:
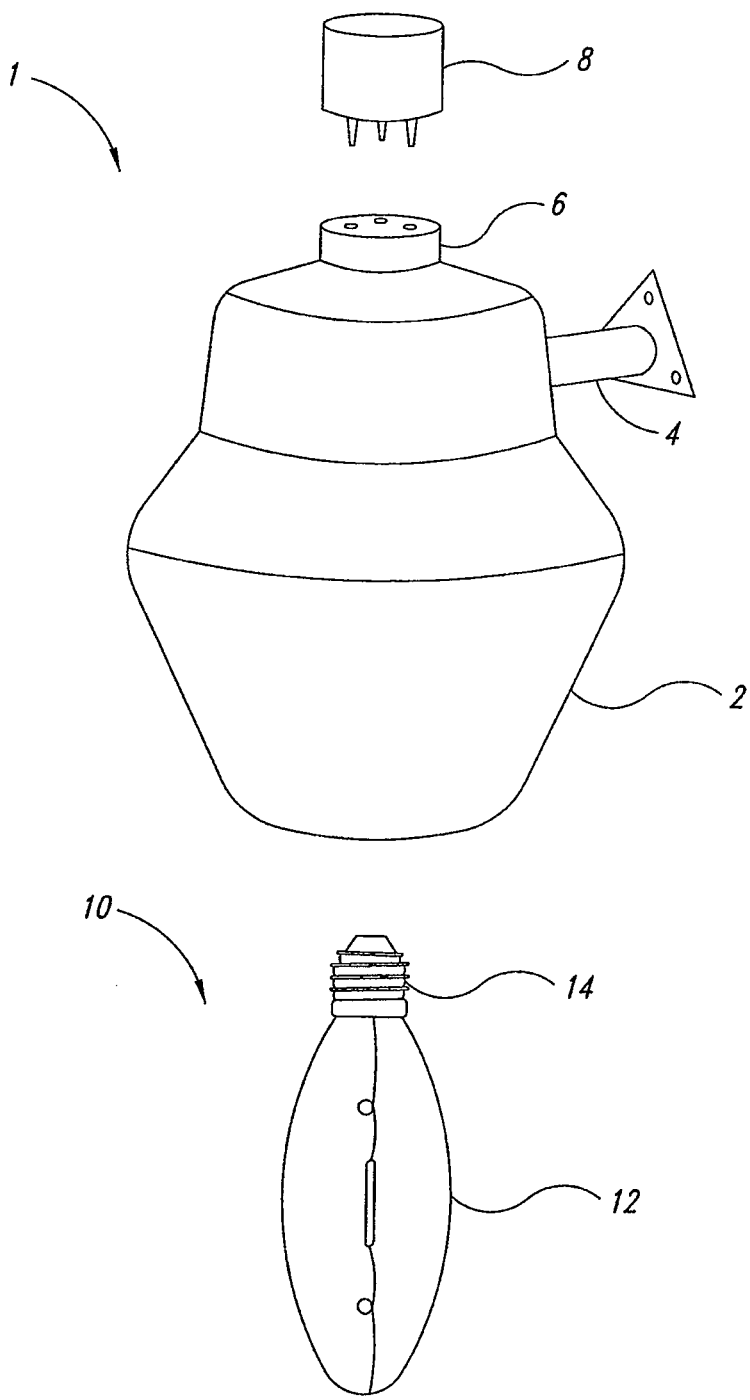
FIG. 1 is an assembly diagram showing a conventional light fixture equipped with a gas-discharge lamp.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting fixtures, power generation and/or power systems for lighting have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

FIG. 1 shows a conventional light fixture 1 equipped with a gas-discharge lamp 10. The light fixture 1 comprises a lamp housing 2 attached to a luminaire mount 4, which is used to mount the light fixture 1 to a structure such as a lamp post, wall, or the like. The lamp housing 2 has a sensor socket 6, where a photo detector, such as ambient light sensor 8, can be inserted into. Additionally, the light fixture 1 has a receptacle, such as a threaded socket (not shown), into which a lamp or an illumination device may be inserted. A gas-discharge lamp 10, such as a mercury-vapor lamp, may be used with the light fixture 1 to provide illumination. The mercury-vapor lamp 10 includes a bulb 12 and a threaded base 14. The mercury-vapor lamp 10 is mounted to the light fixture 1 by inserting the threaded base 14 of the mercury-vapor lamp 10 into the threaded socket of the light fixture 1 to receive power from a power supply (not shown).

The ambient light sensor 8 is electrically coupled between the threaded socket of the light fixture 1 and the power supply. In operation, when the ambient light sensor 8 senses the intensity of the ambient light below a certain threshold, e.g., when it is dusk, the ambient light sensor 8 electrically connects the threaded socket to the power supply. With the mercury-vapor lamp 10 mounted to the light fixture 1, e.g., by having its threaded base 14 inserted in the threaded socket of light fixture 1, the mercury-vapor lamp 10 will be turned on and begins to emit light. As mentioned previously, although the mercury-vapor lamp 10 begins to emit light when powered, it will not provide full output until a period of warm-up time is complete. When the ambient light sensor 8 senses the intensity of the ambient light above a certain threshold, e.g., when it is dawn, the ambient light sensor 8 electrically disconnects the threaded socket from the power supply and thereby turns off the mercury-vapor lamp 10.

Figure 2:
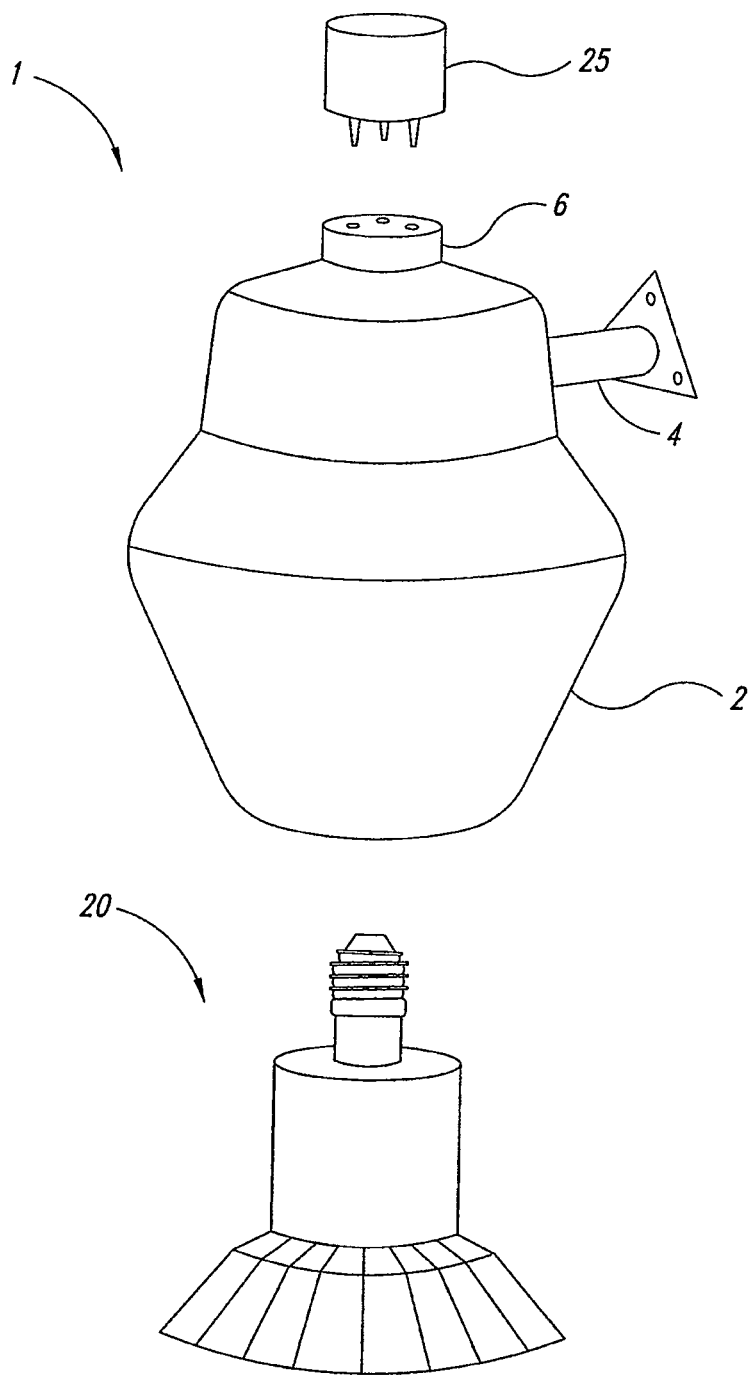
FIG. 2 is an assembly diagram showing a light fixture retrofitted with an illumination device according to one non-limiting illustrated embodiment.

FIG. 2 shows a light fixture 1 retrofitted with an illumination device 20 according to one non-limiting illustrated embodiment. The illumination device 20 replaces a gas-discharge lamp that is typically used with the light fixture 1, such as the mercury-vapor lamp 10 of FIG. 1, and is sized and shaped such that it can fit inside the lamp housing 2 of the light fixture 1. In one embodiment, the illumination device 20 may additionally comprise an activation device 25 to replace the ambient light sensor 8 of FIG. 1. A detailed description of the illumination device 20 and the activation device 25 will be provided below.

Figure 3:
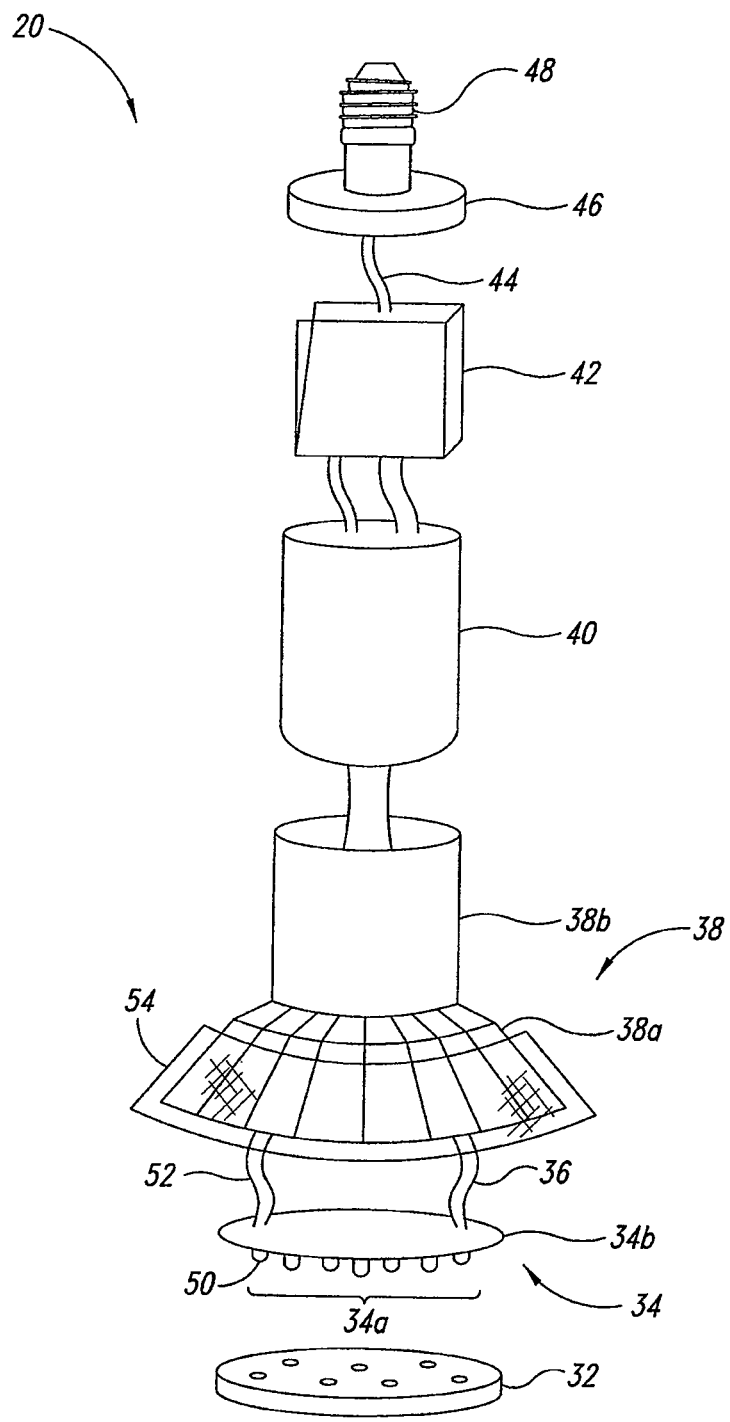
FIG. 3 is an assembly diagram showing an illumination device according to one non-limiting illustrated embodiment.

FIG. 3 shows major components of the illumination device 20 according to one non-limiting illustrated embodiment. A solid-state light emitter is used as the light source in the illumination device 20, and may be a light-emitting diode (LED) device 34 that receives electrical power via LED power wires 36. The LED device 34 may comprise one or more LEDs 34a and an LED circuit board 34b. In one embodiment, LEDs that emit red light, together with LEDs that emit lights in other colors, are utilized as part of the LEDs 34a to produce white light with better CRI. The LEDs 34a are arranged as one or more LED arrays and mounted on the LED circuit board 34b, which interconnects the individual LEDs in the LEDs 34a and may serve as a heat spreader for the LEDs 34a. The illumination device 20 also comprises a cover 32, an active heat transfer device 38, an electronics housing 40, a power control device 42, a base support 46, and a threaded base 48.

Both the LED device 34 and the cover 32 are mounted to the active heat transfer device 38 in such a way that the LED device 34 is sandwiched between the cover 32 and the heat transfer device 38. This arrangement allows the LED device 34 to be physically in contact with the heat transfer device 38 to allow heat generated by the LED device 34 to be absorbed and transferred away by the heat transfer device 38. In one embodiment, at least a portion of the cover 32 is recessed to accommodate the LEDs 34a of the LED device 34. The cover 32 is substantially transparent to pass light emitted by the LED device 34 to provide illumination. Because one of the major sources of failure of LEDs is moisture contamination, when mounted the cover 32 preferably provides a watertight seal to prevent the LED device 34 from being exposed to moisture in the environment such as rain, snow, or humidity in the air. Thus, a sealing structure, such as a gasket, an adhesive substance, or ultrasonic or thermal bonding, may be employed. In addition to a sealed cover 32, a substantially transparent substance, e.g., a gel or liquid such as silicone gel, may be applied to the surface of the LEDs 34a of the LED device 34 which contacts both the LEDs 34a and the cover 32. This substantially transparent substance provides the function of "index matching" the LED surface to the cover 32 so that the reflective losses associated with an LED-to-air and air-to-cover medium transition can be reduced. In one embodiment, the substantially transparent substance is a two part silicone gel such as that manufactured by NYE Corporation or NuSil Silicone Technology.

Typically, LEDs are not 100% efficient at converting electrical energy to light output. As a result, LEDs give off waste energy in the form of heat, which must be conducted, convected, or radiated away from the LEDs to permit long life operation of the LEDs. For this reason the active heat transfer device 38 is used to cool the LEDs 34a and the power control device 42. Because a typical luminaire, as in the case of a security light, has little or no venting to permit the heat to escape the luminaire, an active cooling element (e.g., forced air) that discharges heated air to the environment from the bottom of the luminaire is desired.

In one embodiment, the active heat transfer device 38 may comprise a passive heat sink 38a and an active cooler 38b, and receives electrical power via power wires 44. The LED device 34 is mounted to and in direct contact with the passive heat sink 38a. In one embodiment, the passive heat sink 38a includes multiple fins for increased surface area to transfer heat from the passive heat sink 38a to the ambient air. In one embodiment, the LED device 34 and the cover 32 are mounted to one side of the passive heat sink 38a while the active cooler 38b is mounted to another side of the passive heat sink 38a. Because the LED device 34 is at a higher temperature than the passive heat sink 38a is at when emitting light, the resultant temperature gradient allows the passive heat sink 38a to absorb at least a portion of the heat generated by the LED device 34 and thereby reduce the temperature of the LED device 34. However, thermal modeling has shown that without active cooling, a passive heat sink, such as the passive heat sink 38a, will not be able to keep the junction temperature of the LEDs 34a below a level which prevents reduction in the operational life of the LEDs 34a. In other words, the passive heat sink 38a by itself can remove thermal energy from the LED device 34 at a low rate, but can remove thermal energy from the LED device 34 at a higher rate when the active cooler 38b is powered to keep the temperature of the LED device 34 sufficiently low.

In one embodiment, the active cooler 38b may be a synthetic jet air mover which, when powered, causes surrounding ambient air to circulate through the active cooler 38b and around the passive heat sink 38a, thereby creating turbulent flow of cooling air over fins of the passive heat sink 38a. In one embodiment, the active cooler 38b comprises a synthetic jet air mover, such as one of those manufactured by Nuventix, which takes air in relatively slowly and ejects the same air relatively rapidly. A benefit of this type of air mover is that dust, snowflakes, or other foreign matter is less likely to clog the active heat transfer device 38. As air moves around and past the surfaces of the passive heat sink 38a, thermal energy is transferred from the passive heat sink 38a to the air and thereby aids in the transfer of heat away from the LED device 34. In another embodiment, the active cooler 38b may be a fan or other type of air mover. In an alternative embodiment, the active cooler 38b may be an active cooler that moves a fluid other than ambient air to provide cooling for the passive heat sink 38a and the LED device 34. The fluid may be, for example, water, another type of gas or liquid, or any combination thereof. The passive heat sink 38a preferably has a finned area to maximize its surface area for enhanced heat transfer effect. In one embodiment, a screen or a mesh 54 may be mounted on or in close proximity of the passive heat sink 38a in such a way as to prevent, or at least minimize, foreign matter or insects from entering the finned area of the passive heat sink 38a.

The power control device 42 functions to transform the main AC voltage from the power supply to a regulated current to drive the LEDs 34a of the LED device 34. In one embodiment, the regulated current is approximately 1 ampere and is provided to the LED device 34 via the LED power wires 36. The output voltage of the power control device 42 is determined by the forward voltage drop of the LEDs 34a. In one embodiment, the individual LEDs of the LEDs 34a are coupled in serial and parallel combinations to produce a forward voltage drop of approximately 24 volts.

In one embodiment, a temperature measuring device 50 is used to reduce the current flowing through the LEDs 34a to ensure that the current is at safe levels for long LED operational life. The temperature measuring device 50 receives power from the power control device 42 via temperature sensor wires 52, and may also be sealed by the cover 32. In one embodiment the temperature measuring device 50 is mounted on the LED circuit board 34b and measures the temperature of the LED circuit board 34b, which is representative of the temperature of the LEDs 34a. Alternatively, the temperature measuring device 50 may be mounted to directly measure the temperature of the LEDs 34a. In one embodiment, the temperature measuring device 50 includes a thermistor with negative temperature coefficient, which has a lower resistance at higher temperature and vice versa.

The power control device 42 is mounted to the base support 46, to which the threaded base 48 is also mounted. The power control device 42 receives power from the power supply through the threaded base 48 and power wires 44 when the threaded base 48 is inserted in the threaded socket of the light fixture 1. The base support 46 and the electronics housing 40 may be a unitary piece in one embodiment and separate pieces in an alternative embodiment. Thus, when the illumination device 20 is assembled, the power control device 42 is enclosed in the electronics housing 40, as the base support 46 is mounted to or formed as an integral part of the electronics housing 40 at one end of the electronics housing 40 and the active heat transfer device 38 is mounted to the other end of the electronics housing 40. The active heat transfer device 38 may be partially enclosed in the electronics housing 40. For example, in one embodiment, the active cooler 38b may be enclosed in the electronics housing 40 while the passive heat sink 38a may be partly exposed to the environment. Accordingly, in one embodiment, when the illumination device 20 is installed in the light fixture 1 the portions of the illumination device 20 that are exposed to the environment are the cover 32, the passive heat sink 38a, and the electronics housing 40. In one embodiment, when the illumination device 20 is installed in the light fixture 1, all the light emitted by the LED device 34 is generally directed downward, e.g., toward the ground surface, at an angle of approximately 120 degrees. This not only greatly reduces light trespass but also allows a wide area to be illuminated.

Figure 4:
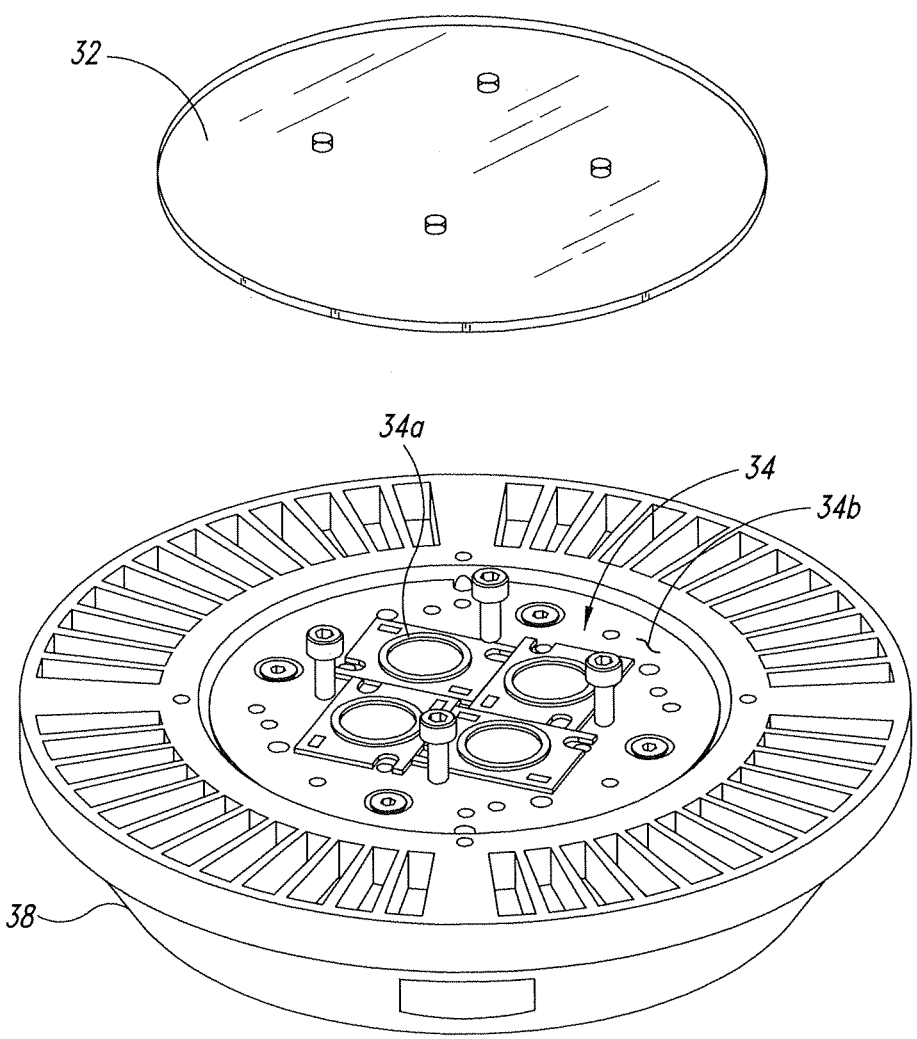
FIG. 4 is a diagram showing a portion of an illumination device according to one non-limiting illustrated embodiment.

FIG. 4 shows a portion of the illumination device 20 according to one non-limiting illustrated embodiment. More specifically, FIG. 4 shows an assembly of the cover 32, the LED device 34, and the active heat transfer device 38. As can be seen, in this particular embodiment, the LEDs 34a of the LED device 34 are arranged into four LED emitters. The cover 32 is mounted to the LED circuit board 34b and the active heat transfer device 38 using fasteners (for example, bolts).

Figure 5:
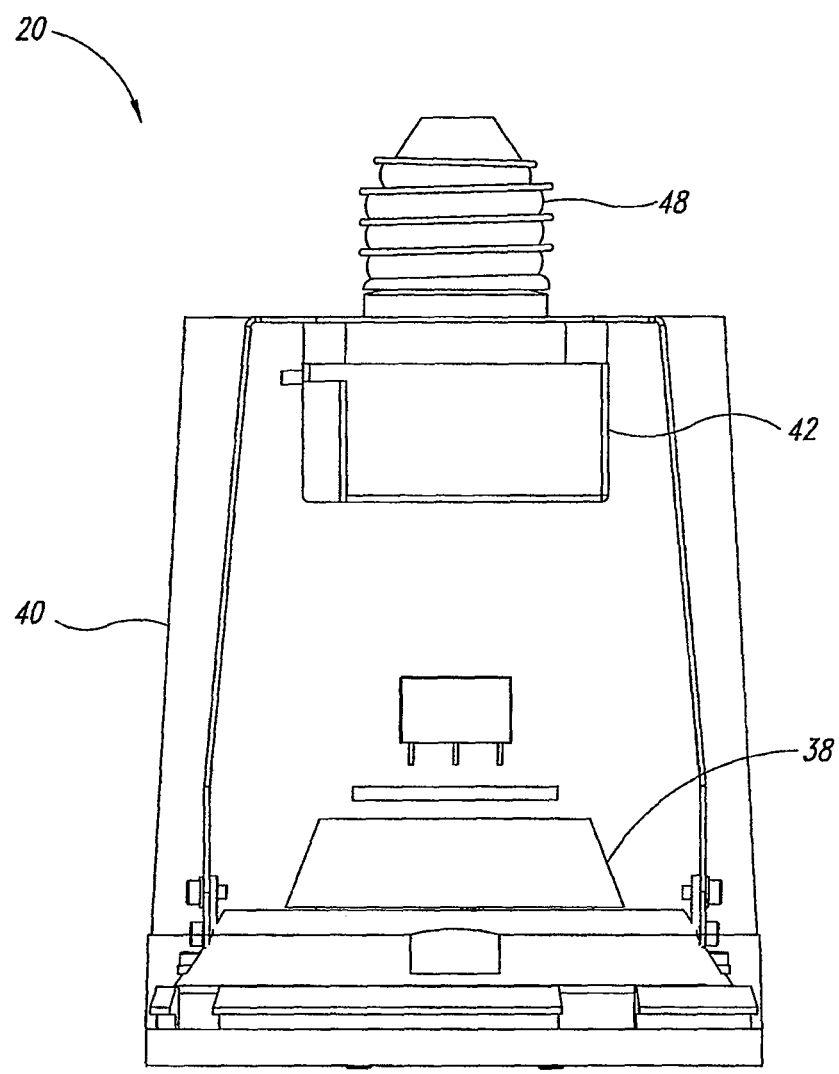
FIG. 5 is a diagram showing a side view of an illumination device according to one non-limiting illustrated embodiment.

FIG. 5 shows a side view of the illumination device 20 according to one non-limiting illustrated embodiment. The electronics housing 40 is rendered transparent in FIG. 5 in order for a reader to see the internal arrangement of the illumination device 20 when its components are assembled together.

Figure 6A:
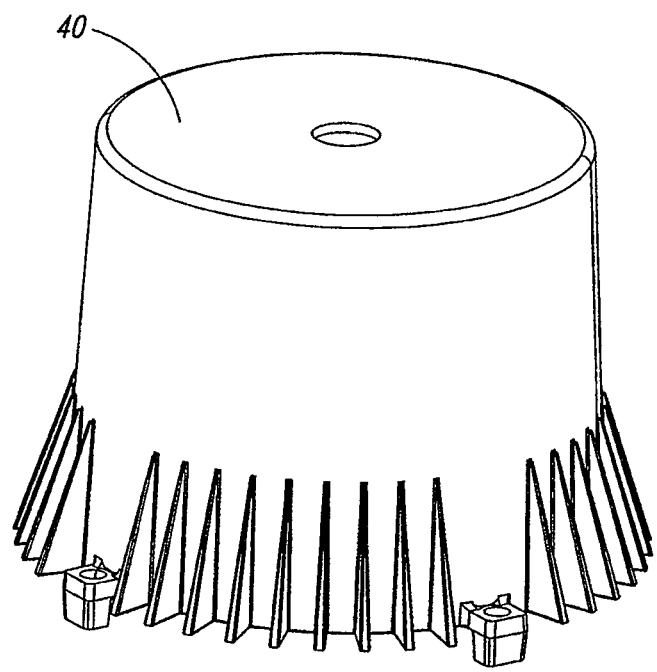
FIG. 6A is a diagram of a housing of an illumination device according to one non-limiting illustrated embodiment.

FIG. 6A shows the electronics housing 40 according to one non-limiting illustrated embodiment. The electronics housing 40 shields components such as the active heat transfer device 38, the power control device 42 and the wirings from the environment, as these components are housed in the electronics housing 40. Because the active heat transfer device 38 and the power control device 42 are housed in, and either directly or indirectly mounted to, the electronics housing 40, the electronics housing 40 may serve as a passive heat sink for these components as well. Accordingly, the electronics housing 40 may be constructed in a way that is conducive to heat transfer. For example, there may be fins around the periphery of the electronics housing 40, as shown in FIG. 6A, to increase the surface area through which thermal energy in the electronics housing 40 can be transferred to the environment. The electronics housing 40 may be made of a material conducive to heat transfer such as, for example, a metallic material, an alloy, a composite material, etc.

The length of the electronics housing 40 may be chosen so that when mounted in a light fixture, e.g., the light fixture 1, the illumination device 20 extends a desired length from the threaded socket of the light fixture. For example, in one embodiment when the threaded base 48 is inserted in the threaded socket of the light fixture 1, the end of the illumination device 20 opposite the threaded base 48, e.g., the cover 32, is flush with the bottom rim of the lamp housing 2. Alternatively, the length of the electronics housing 40 may be shorter, so that the illumination device 20 does not extend out of the lamp housing 2 when mounted in the light fixture 1. Or, the length of the electronics housing 40 may be longer, so that the illumination device 20 extends out of the lamp housing 2 when mounted in the light fixture 1.

Figure 6B:
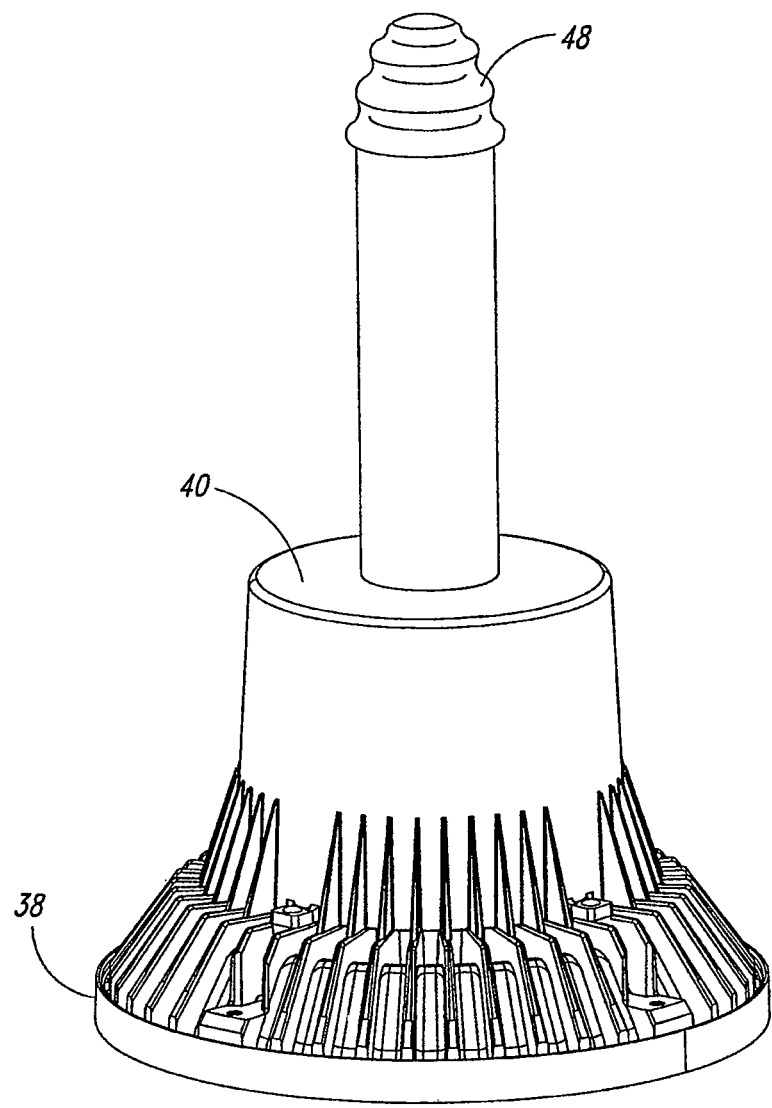
FIG. 6B is a diagram of an illumination device utilizing a housing according to another non-limiting illustrated embodiment.

FIG. 6B shows the illumination device 20 with an electronics housing 40 according to another non-limiting illustrated embodiment. As shown in FIG. 6B, the electronics housing 40 has an elongated portion for increased overall length. FIG. 6B also shows the threaded base 48 mounted to one end of the electronics housing 40 while the active heat transfer device 38 is mounted to the opposite end of the electronics housing 40. Similar to the electronics housing 40 shown in FIG. 6A, the electronics housing 40 shown in FIG. 6B may also have fins around its periphery for improved heat transfer capability.

Figure 7:
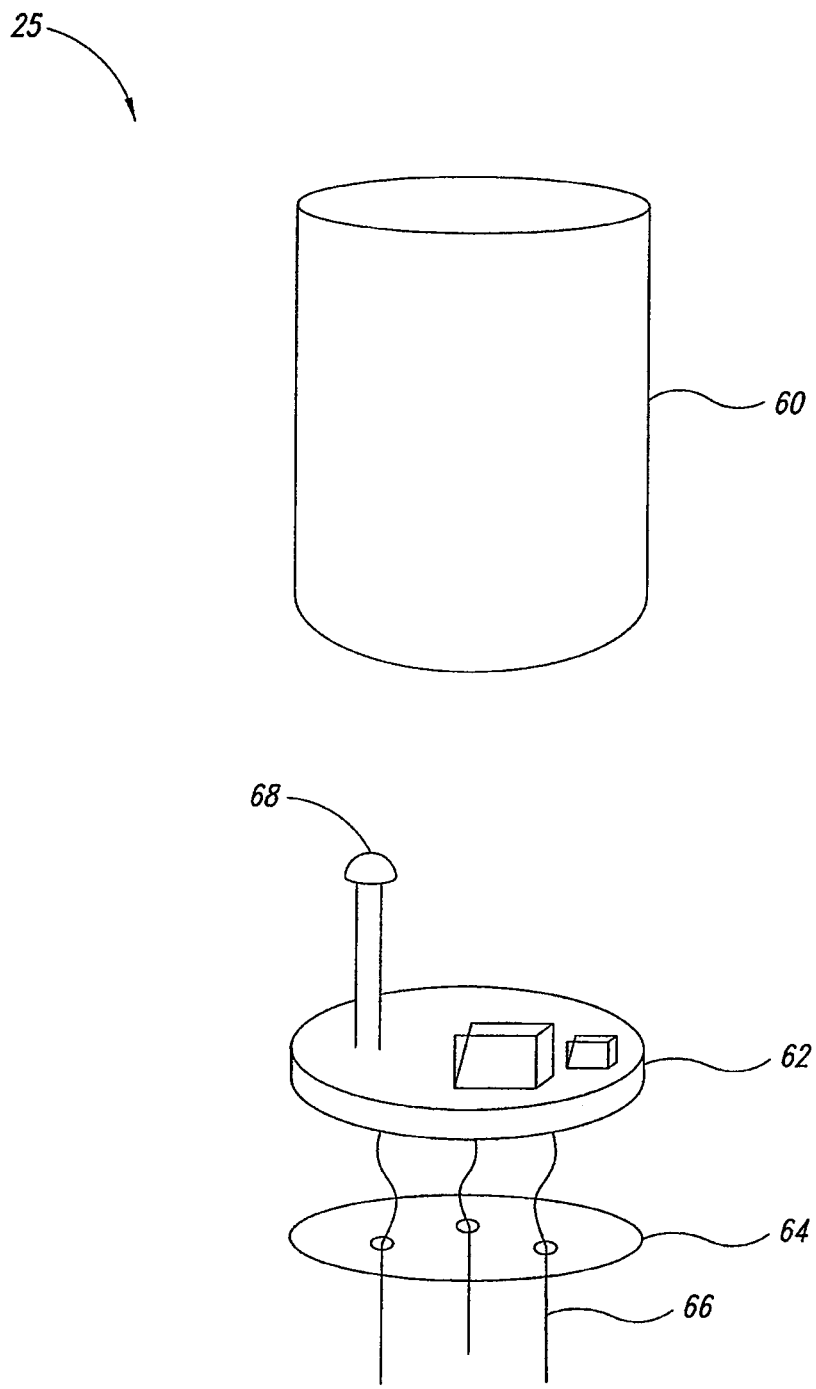
FIG. 7 is an assembly diagram of an activation device according to one non-limiting embodiment.

FIG. 7 shows the activation device 25 according to one non-limiting embodiment. The activation device 25 functions to activate and deactivate, e.g., to turn on and off, the light source of the illumination device 20. The activation device 25 may comprise an activation device housing 60, a control module 62, an insulating base 64, and contacts 66. The control module 62 is mounted to the insulating base 64, and is sealed from the environment with the activation device housing 60 mounted on the insulating base 64. The control module 62 is coupled between the power supply and the illumination device 20 via the contacts 66. In one embodiment, the control module 62 includes a photo detector 68 and the activation device housing 60 is substantially transparent to permit the photo detector 68 to sense the ambient light to turn the illumination device 200n and Off. In one embodiment, the control module 62 may comprise a receiver configured to receive signals compliant with one or more of X10® protocols, Zig-Bee® protocols, and other remote-control protocols. The control module may be configured to receive control signals wirelessly, via a hardware medium such as a wire, or by both means.

Figure 8:
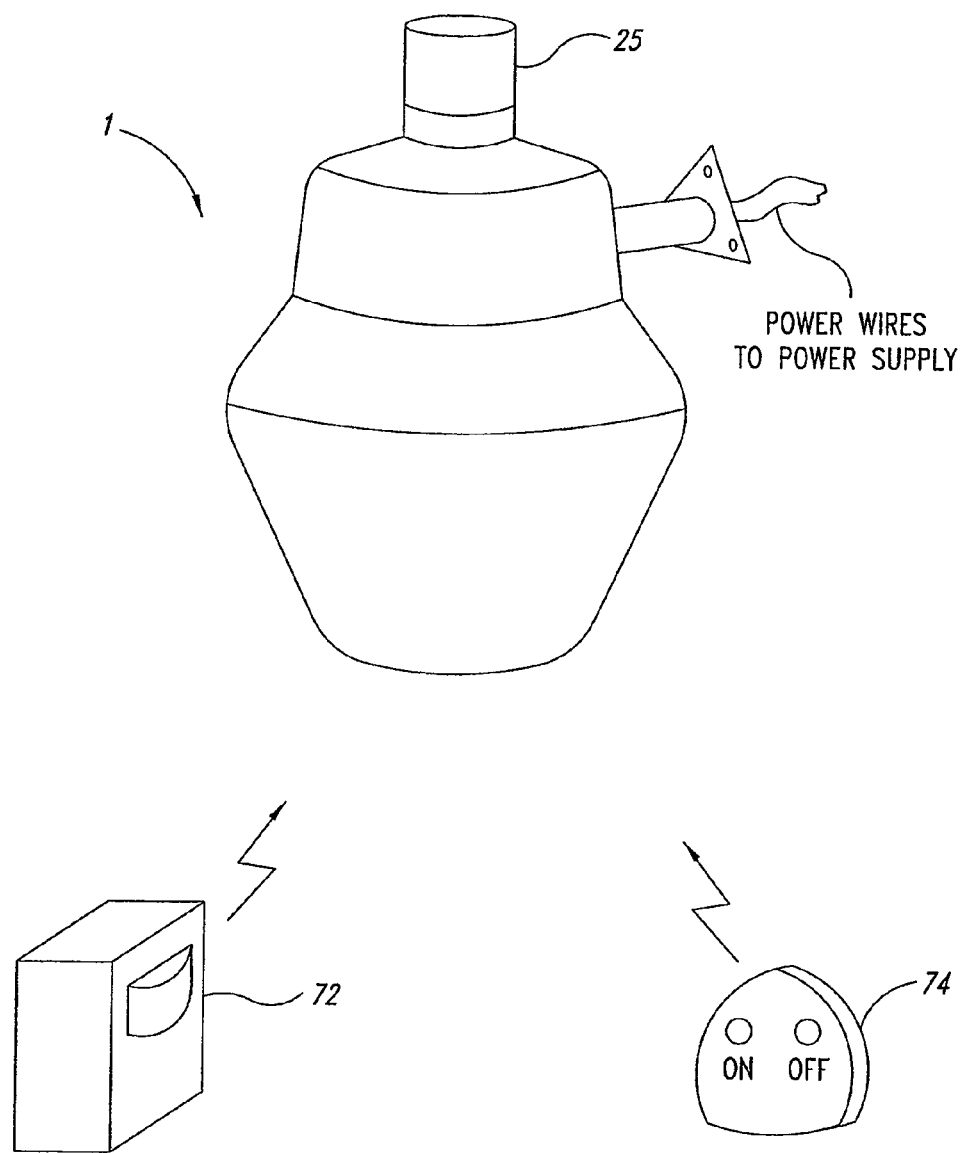
FIG. 8 is a diagram of a light fixture equipped with an illumination device according to one non-limiting embodiment.

FIG. 8 illustrates the light fixture 1 equipped with the illumination device 20 and the activation device 25 according to one non-limiting embodiment. In particular, the activation device 25 as shown in FIG. 8 comprises a ZigBee® receiver (not shown) capable of wirelessly receiving ZigBee®-compliant radio-frequency signals transmitted by either or both of a ZigBee® wireless motion sensor 72 and a ZigBee® wireless switch 74. The activation device 25 may also include the photo detector 68 so that the light source (e.g., the LED device 34) of the illumination device 20 may be turned on and off manually by a user via the ZigBee® wireless switch 74, automatically by the ZigBee® wireless motion sensor 72, and automatically by the photo detector 68.

Figure 9:
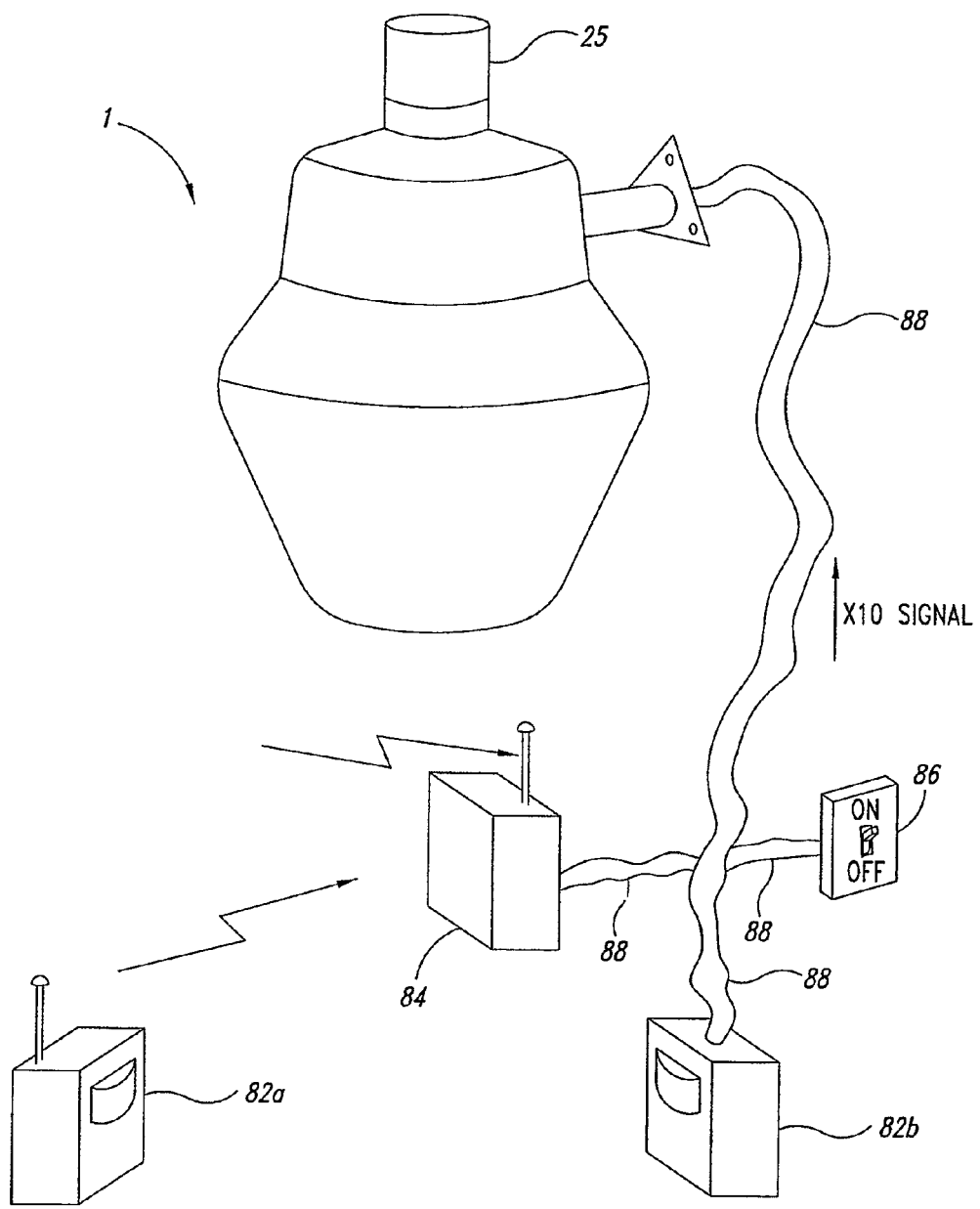
FIG. 9 is a diagram of a light fixture equipped with an illumination device according to another non-limiting embodiment.

FIG. 9 illustrates the light fixture 1 equipped with the illumination device 20 and the activation device 25 according to one non-limiting embodiment. In particular, the activation device 25 as shown in FIG. 9 comprises an X10® receiver (not shown) capable of receiving X10®-compliant signals. The X10®-compliant signals may originate from an X10® wireless motion sensor 82*a* and be transmitted to the activation device 25 via an X10® wireless receiver 84 and power lines 88. Alternatively, the X10®-compliant signals may originate from an X10® motion sensor 82*b* coupled to power lines 88 or from an X10® switch 86 coupled to the power lines 88.

Thus, an illumination device, such as the illumination device 20, is disclosed herein and should greatly improve upon the problems associated with mercury-vapor lamps and the alternative gas-discharge lamps described above. For instance, the illumination device 20 does not contain mercury or other substances restricted by statutes governing the reduction of hazardous substances. By using a solid-state light emitter such as the LED device 34, the illumination device 20 has a much higher power factor, approximately 0.75 pf. Power consumed by the illumination device 20 falls from, for example, 175 watts for a typical mercury-vapor lamp to less than 50 watts. The illumination device 20 has a CRI of at least 75, providing a much better visual perception of an illuminated scene and requiring lower power to provide the desired illumination. Because solid-state light emitters can typically be turned on and off almost instantly as power is applied or removed, the illumination device 20 permits the use of motion-detecting sensors, wireless controls, and other energy-saving controls. With light directed downward at an angle of approximately 120 degrees, the illumination device 20 greatly reduces light trespass while still illuminating a very wide area. Inrush current to the illumination device 20 is reduced by control circuitry, such as the power control device 42, to eliminate the need for expensive overdesign of the electrical wiring. Further, because LEDs do not emit light in the ultraviolet spectrum, they are less attractive to insects.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of security illumination generally described above. For example, although not shown in the figures, in one embodiment the activation device 25 has the photo detector 68 and is configured to receive signals compliant with the X10® and ZigBee® protocols. A luminaire equipped with the illumination device 20 and the activation device 25 so configured may thus be controlled both automatically and manually at least according to the intensity of the ambient light, detection of a motion by an object, and signals that are compliant with the X10® and ZigBee® protocols. In addition to being controllable by X10® and Zig-Bee® signals, the activation device 25 may also be configured to be controlled by other remote-control or automation protocols, or any combination of the protocols thereof.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:
1. An illumination device, comprising:
   an electronics housing having a first end and a second end, the second end opposed across a length of the electronics housing from the first end, the first end including a base adapted to be receivable in a light fixture receptacle configured to receive a gas-discharge lamp;
   a power control device proximate the first end of the electronics housing;

a light source electrically coupled to the power control device and configured to emit light with a color rendering index higher than a respective color rendering index of at least a type of gas-discharge lamp;

an active heat transfer device electrically coupled to the power control device and physically coupled to the light source, the active heat transfer device proximate the second end of the electronics housing and including;

a passive heat sink thermally coupled to and proximate the light source and physically distant from the power control device; and an active cooler proximate the passive heat sink, that when powered by the power control device forces movement of a fluid along at least a portion of the passive heat sink;

a temperature measuring device to measure a temperature of the light source, the temperature measuring device configured to reduce a current flowing through the light source in response to an increase in the measured temperature of the light source to prolong a life of the light source, the temperature measuring device located such that the fluid movement caused by the active cooler does not pass across the temperature measuring device, and a substantially transparent cover, wherein the light source and the cover are mounted to one side of the passive heat sink and the active cooler is mounted to another side of the passive heat sink.

2. The illumination device of claim 1, further comprising:
an activation device coupled between the light source and the power supply, the activation device configured to allow power to be provided to the light source in a first condition, the activation device further configured to prevent power from being provided to the light source in a second condition.

3. The illumination device of claim 2 wherein the activation device comprises a photo-detecting device configured to detect whether or not an intensity of ambient light is above a threshold.

4. The illumination device of claim 2 wherein the activation device comprises a signal receiver configured to receive a control signal from a signal transmitter.

5. The illumination device of claim 4 wherein the signal receiver and the signal transmitter are configured to communicate in signals compliant with at least one of ZigBee protocols and X10 protocols.

6. The illumination device of claim 4 wherein the activation device is configured to receive the control signal from a motion detector.

7. The illumination device of claim 1, further comprising:
a mesh mounted in a way to prevent at least some foreign objects from entering the active heat transfer device.

8. The illumination device of claim 1 wherein the light source comprises at least one solid-state light emitting device.

9. The illumination device of claim 1 wherein the light source comprises at least one light-emitting diode.

10. The illumination device of claim 1 wherein the electronics housing includes fin-shaped structures around a peripheral surface of the electronics housing.

11. The illumination device of claim 1 wherein the temperature measuring device comprises a thermistor having a negative temperature coefficient.

12. The illumination device of claim 1 wherein the passive heat sink physically coupled to the light source includes a passive heat sink comprising a plurality of extended surface fins physically coupled to the light source.

13. The illumination device of claim 12 wherein the extended surface passive heat sink defines a generally cylindrical or frustoconical shape, and wherein the active cooler portion is physically coupled to the extended surface passive heat sink at one end of the extended surface passive heat sink.

14. An illumination device, comprising:
a solid-state light emitter;
a power control device;
a temperature measuring device to measure a temperature of the solid-state light emitter to reduce a current flowing through the solid-state light emitter responsive to an increase in the measured temperature of the solid-state light emitter;
a passive heat sink thermally coupled to and proximate the solid-state light emitter and physically distant from the power control device;
an active heat transfer device to which the solid-state light emitter is mounted, the active heat transfer device configured to remove thermal energy from the solid-state light emitter at a first rate when not powered and at a second rate higher than the first rate when powered by the power control device; the active heat transfer device including a synthetic jet air mover configured to receive power from the power control device to force air to move towards and around the passive heat sink;
wherein the air moved by the synthetic jet air mover does not pass across the temperature measuring device; and
a substantially transparent cover, the solid-state light emitter and the cover mounted to one side of the passive heat sink and the active cooler is mounted to another side of the passive heat sink.

15. The illumination device of claim 14, further comprising:
an activation device coupled to control an electrical connection between the power control device and the solid-state light emitter to activate and deactivate the solid-state light emitter.

16. The illumination device of claim 15 wherein the activation device controls the electrical connection between the power control device and the solid-state light emitter based on an input from at least one of a photo detector, a ZigBee-compliant device, a X10-compliant device, and a motion detector.

17. The illumination device of claim 16 wherein the activation device is configured to receive the input by at least one of wireless transmission and wired transmission.

18. The illumination device of claim 14 wherein the solid-state light emitter comprises at least one light-emitting diode.

19. The illumination device of claim 14, further comprising:
an electronics housing adapted to fit in the gas-discharge lamp light fixture, the electronics housing having an opening in a first end to which the active heat transfer device is mounted, the electronics housing further having a threaded base in a second end opposite the first end for insertion into a threaded socket of the light fixture to connect to a power supply.

20. The illumination device of claim 19 wherein the electronics housing includes fin-shaped structures around a peripheral surface of the electronics housing.

21. The illumination device of claim 14, further comprising:
a based sized and dimensioned to be received in a light fixture receptacle configured to receive a gas-discharge lamp.

22. An illumination device, comprising:
a solid-state light emitter;
an active heat transfer device to which the solid-state light emitter is mounted, the heat transfer device configured to remove thermal energy from the solid-state light emitter at a first rate when not powered and at a second rate higher than the first rate when powered;
a temperature measuring device to measure a temperature of the solid-state light emitter to reduce a current flowing through the solid-state light emitter responsive to an increase in the measured temperature of the solid-state light emitter;
a passive heat sink physically coupled to the solid-state light emitter;
wherein the active heat transfer device comprises a synthetic jet air mover configured to receive power from a power control device physically distant from and electrically coupled to the solid-state light emitter, the active heat transfer device to force air to move towards and around the passive heat sink;
a cover mounted on the heat transfer device to enclose the solid-state light emitter between the cover and the heat transfer device, the cover being substantially transparent; and
a non-gaseous substantially transparent substance applied between and in contact with the solid-state light emitter and the cover to provide index matching between the solid-state light emitter and the cover to reduce reflective losses in light emitted by the solid-state light emitter, wherein the passive heat sink is positioned between the synthetic jet air mover and the solid-state light emitter.

* * * * *